(12) United States Patent
Liu (10) Patent No.: US 11,786,037 B2
(45) Date of Patent: *Oct. 17, 2023

(54) SEATING DEVICE

(71) Applicant: Chuanqi Liu, Foshan (CN)

(72) Inventor: Chuanqi Liu, Foshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,651

(22) Filed: Apr. 14, 2022

(65) Prior Publication Data

US 2022/0312973 A1 Oct. 6, 2022

Related U.S. Application Data

(63) Continuation of application No. 17/218,095, filed on Mar. 30, 2021, now Pat. No. 11,419,421.

(51) Int. Cl.
*B62J 1/00* (2006.01)
*B62J 1/18* (2006.01)
*A47C 7/02* (2006.01)

(52) U.S. Cl.
CPC ............... *A47C 7/029* (2018.08); *B62J 1/005* (2013.01); *B62J 1/007* (2013.01)

(58) Field of Classification Search
CPC ............ A47C 7/029; B62J 1/007; B62J 1/005
USPC ................. 297/195.1, 195.11, 208, 201, 202
See application file for complete search history.

(56) References Cited

U.S. PATENT DOCUMENTS

| | | | | |
|---|---|---|---|---|
| 576,310 A * | 2/1897 | Henderson | ............... | B62J 1/002 297/202 |
| 608,682 A * | 8/1898 | Jamieson | ................. | B62J 1/005 297/201 |
| 619,204 A * | 2/1899 | Moore | ..................... | B62J 1/005 297/201 |
| 622,357 A * | 4/1899 | Hitchcock | ................ | B62J 1/005 297/202 |
| 629,956 A * | 8/1899 | Craig | ....................... | B62J 1/005 297/201 |
| 694,875 A * | 3/1902 | Meighan | .................. | B62J 1/005 297/201 |
| 4,063,775 A * | 12/1977 | Mesinger | ................... | B62J 1/08 297/201 X |
| 4,512,608 A * | 4/1985 | Erani | ....................... | B62J 1/005 297/195.12 |

(Continued)

FOREIGN PATENT DOCUMENTS

| | | | | |
|---|---|---|---|---|
| DE | 20308872 U1 * | 8/2003 | ............. | B62J 1/002 |
| DE | 20206837 U1 * | 9/2003 | ............. | B62J 1/005 |

(Continued)

*Primary Examiner* — Rodney B White
(74) *Attorney, Agent, or Firm* — Raymond Y. Chan; David and Raymond Patent Firm (57) ABSTRACT

A seating device includes a seat body having a top seat supporting surface, a mounting base coupled at a bottom surface of the seat body, and two wing supports sidewardly extended from two sides of the seat body respectively, wherein each of the wing supports has a top buttock supporting surface upwardly and sidewardly extended from the top seat supporting surface of the seat body to a side tip of the wing support, and a bottom retention surface inclinedly and upwardly extended to the side tip of the wing support for reinforcing the wing support in a tilt up manner so as to prevent the wing support being sagged down when the wing support is pressured.

9 Claims, 12 Drawing Sheets

(56) References Cited

U.S. PATENT DOCUMENTS

| | | | | |
|---|---|---|---|---|
| 4,607,882 A * | 8/1986 | Opsvik | ............... | A47C 7/029 |
| | | | | 297/195.11 |
| 4,877,286 A * | 10/1989 | Hobson | ............... | B62J 1/002 |
| | | | | 297/201 X |
| 4,932,719 A * | 6/1990 | Gonzalez y. Rojas | ............... | |
| | | | | A47C 7/029 |
| | | | | 297/195.11 |
| 5,645,315 A * | 7/1997 | Walker | ............... | B62J 1/007 |
| | | | | 297/202 |
| 5,823,618 A * | 10/1998 | Fox | ............... | B62J 1/005 |
| | | | | 297/202 |
| 5,978,970 A * | 11/1999 | Bright | ............... | B62J 1/007 |
| | | | | 2/467 |
| 6,056,356 A * | 5/2000 | Unger, Jr. | ............... | B62J 1/04 |
| | | | | 297/215.15 |
| 6,068,333 A * | 5/2000 | Dixon | ............... | B62J 1/007 |
| | | | | 297/214 |
| 6,139,098 A * | 10/2000 | Carrillo | ............... | B62J 1/007 |
| | | | | 297/202 |
| 6,231,122 B1 * | 5/2001 | Goldstein | ............... | B62J 1/08 |
| | | | | 297/214 |
| 6,254,180 B1 * | 7/2001 | Nelson | ............... | B62J 1/002 |
| | | | | 297/202 |
| 6,257,662 B1 * | 7/2001 | Yates | ............... | B62J 1/10 |
| | | | | 297/202 |
| 6,290,291 B1 * | 9/2001 | Kojima | ............... | B62J 1/10 |
| | | | | 297/201 X |
| 6,322,139 B1 * | 11/2001 | Chuang | ............... | B62J 1/00 |
| | | | | 297/202 |
| 6,402,236 B1 * | 6/2002 | Yates | ............... | B62J 1/10 |
| | | | | 297/201 |
| 6,709,052 B2 * | 3/2004 | Jalkanen | ............... | A47C 7/029 |
| | | | | 297/202 |
| 11,419,421 B1 * | 8/2022 | Liu | ............... | B62J 1/005 |
| 2003/0038515 A1 * | 2/2003 | Martin | ............... | B62J 1/10 |
| | | | | 297/195.1 |
| 2003/0067195 A1 * | 4/2003 | Sylvester | ............... | B62J 1/005 |
| | | | | 297/201 |
| 2004/0066066 A1 * | 4/2004 | Hobson | ............... | B62J 1/10 |
| | | | | 297/201 |
| 2006/0255631 A1 * | 11/2006 | Ljubich | ............... | B62J 1/005 |
| | | | | 297/201 |
| 2007/0200399 A1 * | 8/2007 | Riondato | ............... | B62J 1/007 |
| | | | | 297/202 |
| 2014/0265468 A1 * | 9/2014 | Greenhill | ............... | B62J 1/02 |
| | | | | 297/208 |
| 2015/0251717 A1 * | 9/2015 | Portz | ............... | B62J 1/005 |
| | | | | 297/201 |
| 2017/0233020 A1 * | 8/2017 | Goff | ............... | B62J 1/005 |
| | | | | 297/201 |
| 2020/0102033 A1 * | 4/2020 | Main | ............... | B62J 1/04 |
| 2022/0009575 A1 * | 1/2022 | Main | ............... | B62J 1/10 |

FOREIGN PATENT DOCUMENTS

| | | | | |
|---|---|---|---|---|
| EP | 3922539 A4 * | 12/2021 | ............... | B62J 1/005 |
| WO | WO-9211175 A1 * | 7/1992 | ............... | B62J 1/00 |
| WO | WO-0051877 A1 * | 9/2000 | ............... | B62J 1/00 |

* cited by examiner

FIG.1A  FIG.1B

PRIOR ART

FIG.2A  FIG.2B

PRIOR ART

SEATING DEVICE

CROSS REFERENCE OF RELATED APPLICATION

This application is a Continuation application that claims the benefit of priority under 35 U.S.C. § 120 to a non-provisional application, application Ser. No. 17/218,095, filed Mar. 30, 2021, now U.S. Pat. No. 11,419,421 B1, which is incorporated herewith by reference in its entirety.

BACKGROUND OF THE PRESENT INVENTION

Field of Invention

The present invention relates to a seat frame, and more particularly to a seating device, which comprises two wing supports sidewardly and upwardly extended from a seat body to provide pain relief in legs, butt, and tailbone of a user.

Description of Related Arts

Figure 1A:
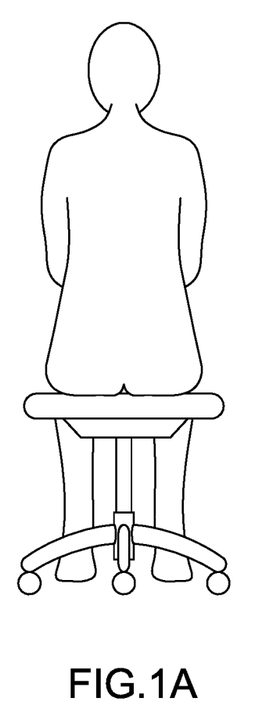
FIGS. 1A and 1B illustrate a conventional seat cushion of a chair.
Figure 1B:
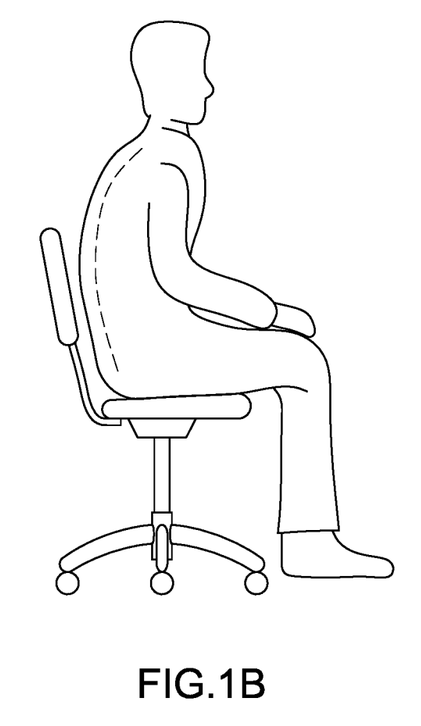

A seat is a device commonly incorporated with a chair, stool, or sport equipment for supporting buttocks of a user. Most of the seats incorporate with cushion to form seat cushions to let the user sitting more comfortable. Particularly, some seat cushions claims as ergonomic cushions which can help relief tailbone pressure, provide lumbar support, and improve posture. For example, the seat cushion is incorporated with a chair frame to form a chair seat A1, as shown in FIGS. 1A and 1B, wherein the chair seat A1 provides a widen and flat seating surface to support the buttocks of the user. However, when the chair seat A1 is seated, the buttocks of the user are flatten that two outer sides of the user's buttocks are unsupported by the chair seat A1. As a result, the user is supported on the chair seat A1 in an unbalance manner. In other words, when the user's body or the user's leg slightly move either to the left or right, a center of the mass of the user will shift correspondingly. However, the chair seat A1 cannot provide a butt side support corresponding the movement of the user.

Figure 2A:
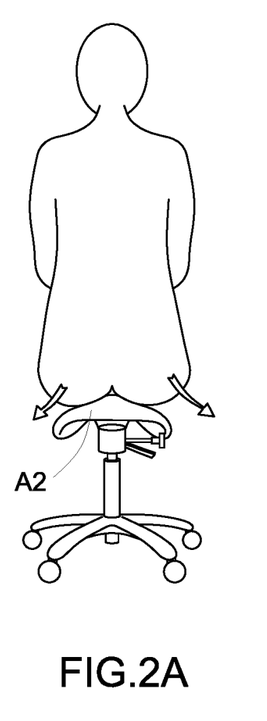
FIGS. 2A and 2B illustrate a conventional seat cushion of a stool.
Figure 2B:
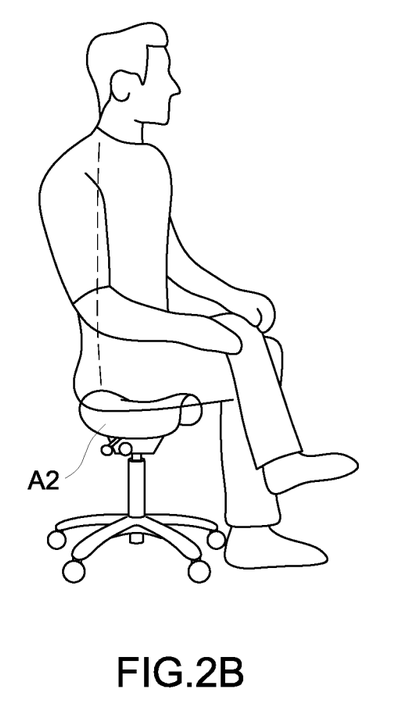

FIGS. 2A and 2B illustrates the seat cushion incorporated with a stool to form a stool seat A2, wherein two side portion of the stool seat A2 are extended downwardly. Similar to the chair seat A1, the stool seat A2 cannot support the two outer sides of the user's buttocks, such that the user is supported on the stool seat A2 in an unbalance manner especially due to the user's movement. For example, when the user sits slumped to one side with spine bent or keep the knees, ankles or arm crossed, the user will sit on the chair seat A for stool seat A2 in an unbalance manner to create stresses at the user's buttocks. Furthermore, in order for the user to self balance his or her body, the user must lean his or her upper body forward to reduce the stress at two sides of the buttocks. It is known that the user must sit up straight to prevent the lower back strain and tailbone pain. The lean forward sitting posture will cause the spine curvature problem of the user as shown in FIGS. 1B and 2B.

Figure 3A:
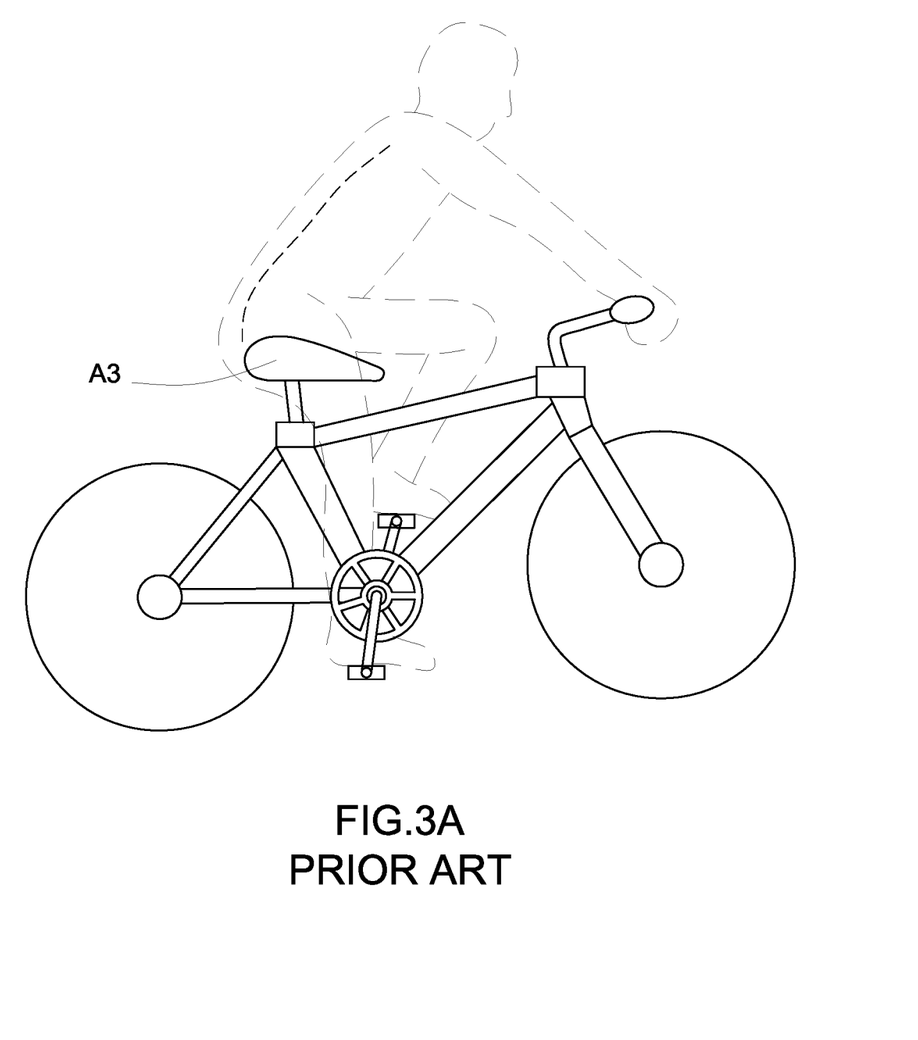
FIGS. 3A and 3B illustrate a conventional seat cushion of a bicycle.
Figure 3B:
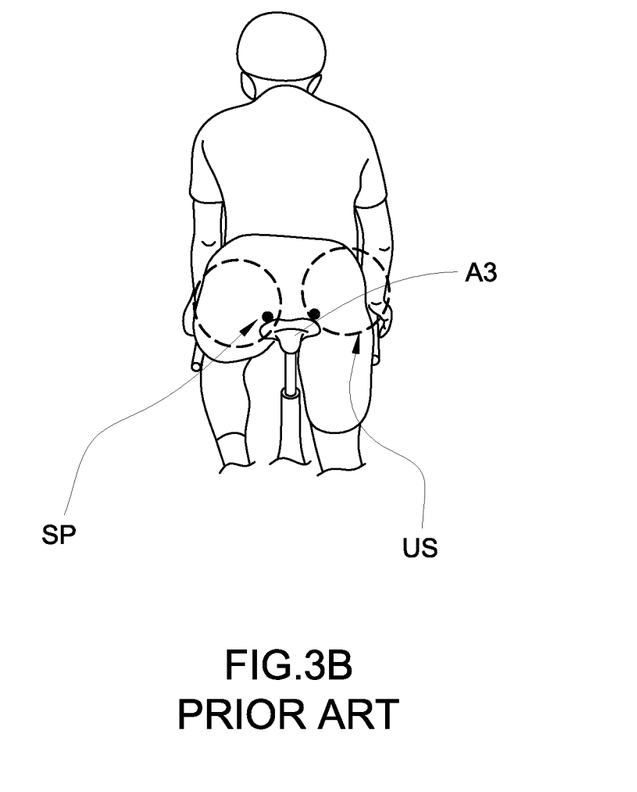

FIGS. 3A and 3B illustrates the seat cushion incorporated with a bicycle to form a bicycle saddle. Accordingly, the bicycle saddle A3 generally has a long narrow shape, wherein the bicycle saddle A3 totally cannot support the two outer sides of the user's buttocks. Therefore, most of the users experience discomfort when sitting on the bicycle saddle A3. Especially the bicycle saddle A3 is a cushioning saddle designed for recreational cycling and cruising, the bicycle saddle A3 cannot well support the user when pedaling the bicycle, such that the center of the mass of the user will shift correspondingly. For example, when the left pedal is pressed by a left leg of the user, the center of mass of the user will shift to the right for body balancing purpose, such that the stress point will create at the right buttock of the user. Likewise, when the right pedal is pressed by a right leg of the user, the center of mass of the user will shift to the left body, such that the stress point SP will create at the left buttock of the user while the right buttock US of the user is unsupported as shown in FIG. 3B. However, the two outer sides of the user's buttocks are unsupported by the bicycle saddle, the stresses at the buttocks will create pain in legs, butt, and tailbone of the user.

As a result, none of the seat cushion provides enough buttock support due to the user movement. Therefore, there is a need for a seat cushion that provides enough buttock support to provide pain relief in legs, butt, and tailbone of the user.

SUMMARY OF THE PRESENT INVENTION

The invention is advantageous in that it provides a seating device, which comprises two wing supports sidewardly and upwardly extended from a seat body to provide pain relief in legs, butt, and tailbone of a user.

Another advantage of the invention is to provide a seating device, wherein each of the wing supports forms a basin shaped buttock supporting surface to provide a full contact surface and support for the buttock of the user.

Another advantage of the invention is to provide a seating device, wherein the stress points of the buttocks of the user are located within the wing supports to reduce the stresses created at the buttocks of the user when the user sits on the seating device.

Another advantage of the invention is to provide a seating device, which has an indented channel indented on the seating device for ventilation and for keeping pressure off of the crotch area of the user when the user sits on the seating device.

Another advantage of the invention is to provide a seating device, wherein the user is able to maintain in balance manner when the user sits slumped to one side with spine bent, keep the knees, ankles or arm crossed, or any body movement.

Another advantage of the invention is to provide a seating device, wherein the wing supports are able to concurrently and sidewardly move to selectively adjust a distance between the wing supports so as to selectively adjust a width of the seating device for different hip sizes of the users.

Another advantage of the invention is to provide a seating device, wherein the seating device is able to incorporate with any existing frame to form a seating apparatus. For example, the seating device is coupled to a chair to form a chair seat, the seating device is coupled to a stool to form a stool seat, and the seating device is coupled to a bicycle to form a bicycle saddle.

Another advantage of the invention is to provide a seating device, which does not require to alter the original structural design of the existing frame, so as to minimize the manufacturing cost of the frame incorporating with the seating device.

Another advantage of the invention is to provide a seating device, wherein no expensive or complicated structure is required to employ in the present invention in order to achieve the above mentioned objects. Therefore, the present invention successfully provides an economic and efficient solution for well supporting the buttocks of the user to provide pain relief in legs, butt, and tailbone of the user.

Additional advantages and features of the invention will become apparent from the description which follows, and may be realized by means of the instrumentalities and combinations particular point out in the appended claims.

According to the present invention, the foregoing and other objects and advantages are attained by a seating device, comprising:

a seat body having a top seat supporting surface;

two wing supports sidewardly extended from two sides of the seat body respectively, wherein each of the wing supports has a top buttock supporting surface upwardly and sidewardly extended from the top seat supporting surface of the seat body to a side tip of the wing support, and a bottom retention surface inclinedly and upwardly extended to the side tip of the wing support for reinforcing the wing support in a tilt up manner so as to prevent the wing support being sagged down when the wing support is pressured; and a mounting base coupled at a bottom surface of the seat body for mounting to a frame, such that when the user sits on the seat body, two buttocks of the user are supported by the wing supports respectively.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 4:
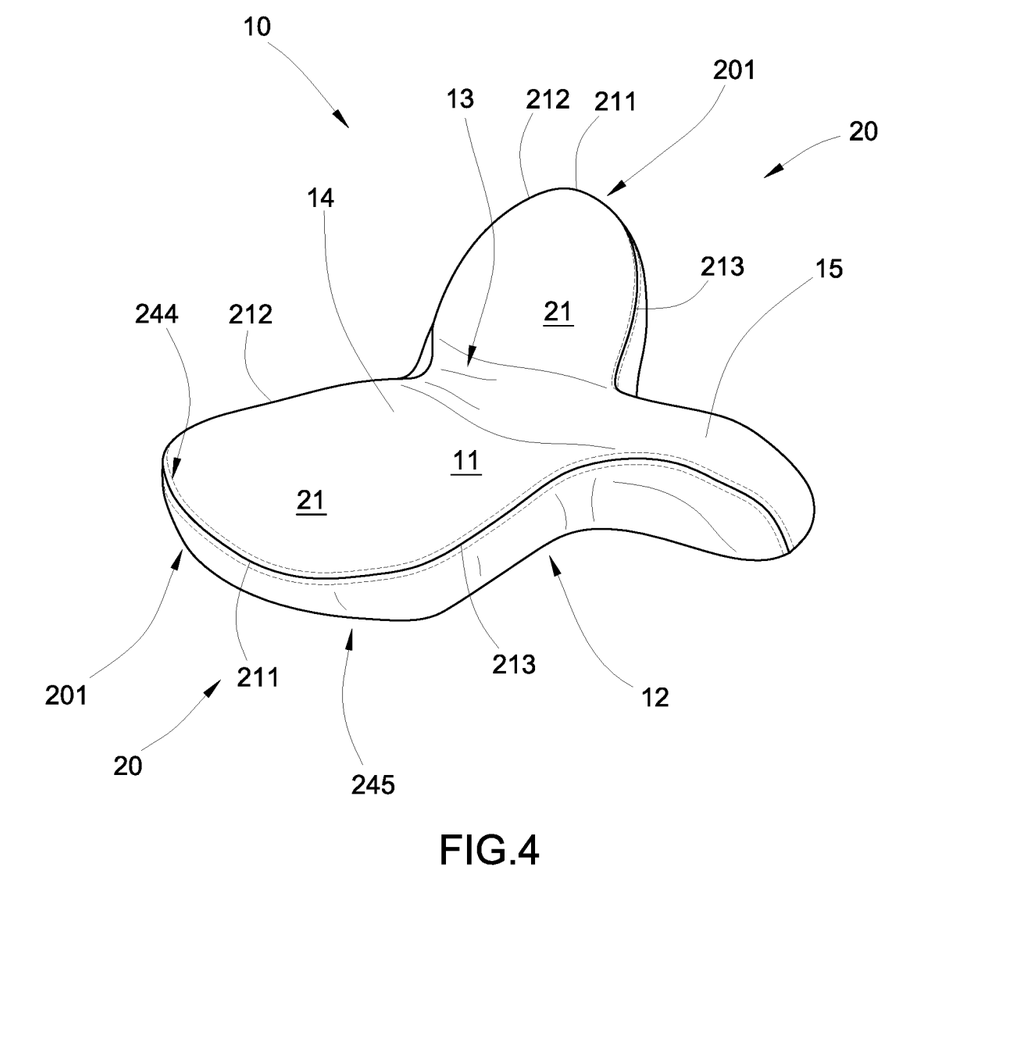
FIG. 4 is a perspective view of a seating device according to a preferred embodiment of the present invention.
Figure 5A:
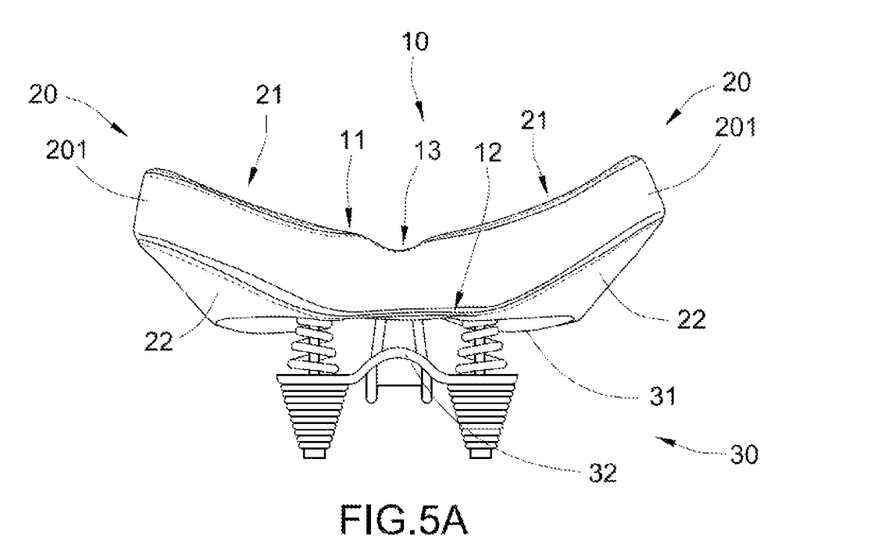
FIG. 5A is a rear view of the seating device according to the above preferred embodiment of the present invention.
Figure 5B:
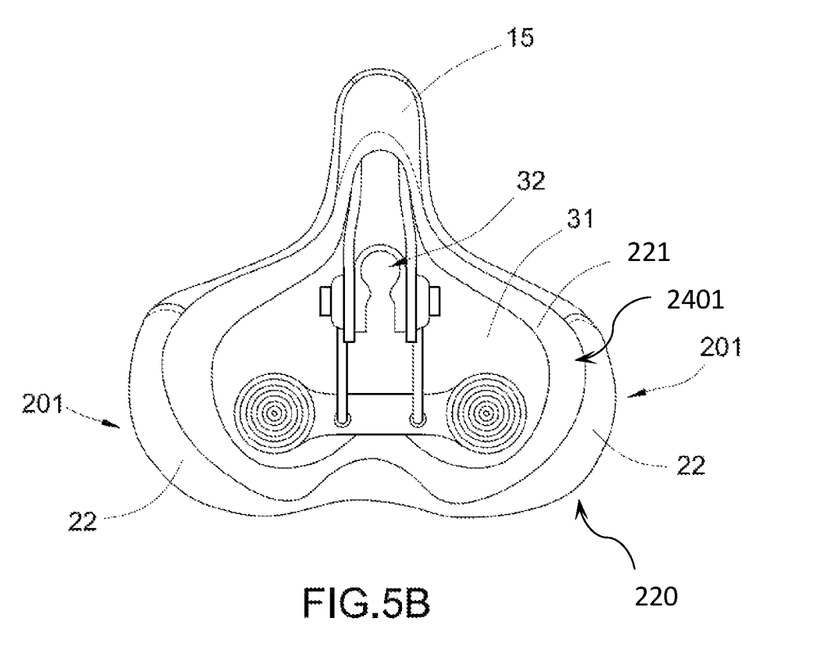
FIG. 5B is a bottom view of the seating device according to the above preferred embodiment of the present invention.

Referring to FIGS. 4, 5A and 5B of the drawings, a seating device according to a preferred embodiment of the present invention is illustrated, wherein the seating device comprises a seat body 10, two wing supports 20 and a mounting base 30.

The seat body 10 has a top seat supporting surface 11, a bottom surface 12, and an indented channel 13 indented on the top seat supporting surface 11 from a rear end of the seating body toward a front end along a center line of the seating body 10.

The two wing supports 20 are configured to support the buttocks of the user, wherein the wing supports 20 serve as the hip support to prevent any unwanted movement of the user when the user sits on the seating device of the present invention. Particularly, the seat body 10 incorporates the wing supports 20 to provide lateral support and weight distribution for maintaining a sitting posture of the user in a balancing and stabling manner so as to provide pain relief in legs, butt, and tailbone of the user especially sitting for an extended period.

The two wing supports 20 are sidewardly extended from two sides of the seat body 10 respectively, wherein each of the wing supports 20 has a top buttock supporting surface 21 upwardly and sidewardly extended from the top seat supporting surface 11 of the seat body 10 to a side tip 201 of the wing support 20, and a bottom retention surface 22 inclinedly and upwardly extended to the side tip 201 of the wing support 20 for reinforcing the wing support 20 in a tilt up manner so as to prevent the wing support 20 being sagged down when the wing support 20 is pressured, i.e. when the user sits thereon.

Figure 8:
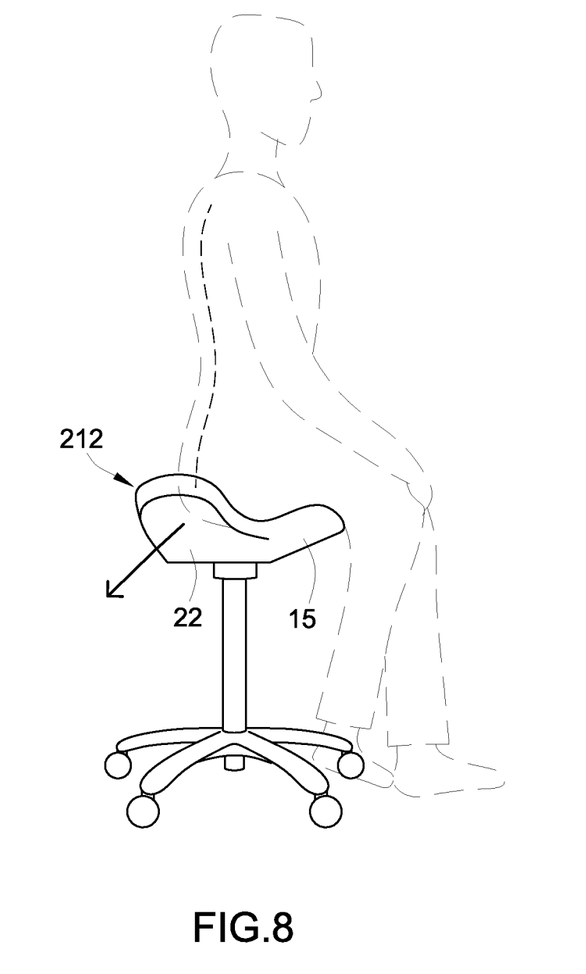
FIG. 8 is a side view of the seating device being used in a stool according to the above preferred embodiment of the present invention, illustrating the user sits up straight on the seating device to protect the spine of the user.
Figure 9:
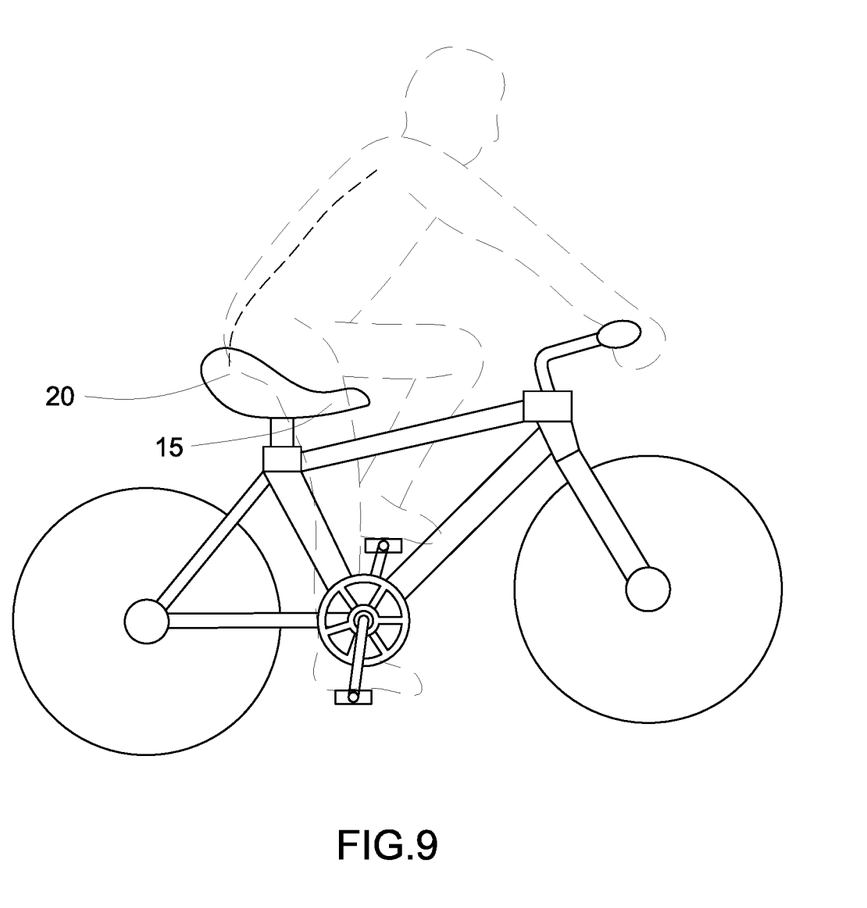
FIG. 9 is a side view of the seating device being used in a bicycle according to the above preferred embodiment of the present invention, illustrating the user supports on the seating device in a balance manner.

The mounting base 30 is coupled at the bottom surface 12 of the seat body 10, wherein the mounting base 30 is adapted to mount at any existing frame. For example, when the mounting base 30 is coupled at a stool frame, as shown in FIG. 8, the seating device of the present invention serves as a stool seat. When the mounting base 30 is coupled at a bicycle frame, as shown in FIG. 9, the seating device of the present invention serves as a bicycle saddle. Accordingly, the mounting base 30 comprises a mounting plate 31 coupled at the bottom surface 12 of the seat body 10 and a mounting structure 32 to mount at the existing frame. Therefore, different mounting structures 32 can be selectively mounted to the mounting plate 31 to selectively couple to different existing frames. In other words, when the stool mounting structure is mounted to the mounting plate 31, the seating device of the present invention can mount to the stool to serve as a stool seat as shown in FIG. 8. When the bicycle mounting structure is mounted to the mounting plate 31, the seating device of the present invention can mount to the bicycle to serve as a bicycle saddle as shown in FIG. 9.

The seat body 10 has an enlarged seat portion 14 and an elongated head portion 15 integrally and frontwardly extended from the seat portion 14, wherein a width of the seat portion 14 is larger than a width of the head portion 15. The top seat supporting surface 11 of the seat body 10 is defined at a top surface of the seat portion 14, such that when the user sits on the seat body 10, the buttocks of the user are supported on the seat portion 14, while the head portion 15 is extended between the thighs of the user so as to allow the leg movement of the user. It is worth mentioning that the indented channel 13 indented on top surface of the seat portion 14 and is extended toward the head portion 15 of the seat body 10.

In one embodiment, the wing supports 20 are integrally extended from the seat body 10 to form a one piece seating member. Accordingly, the seat body 10 is embodied in form of a bicycle saddle. Generally, the seat body 10 has an isosceles triangular shape, wherein the wing supports 20 are extended from two equal sides of the seat body 10 at rear portions thereof respectively. Particularly, the wings supports 20 are integrally and sidewardly extended from two sides of the seat portion 14 of the seat body 15 respectively, such that the head portion 15 is frontwardly extended between the wing supports 20.

Figure 7:
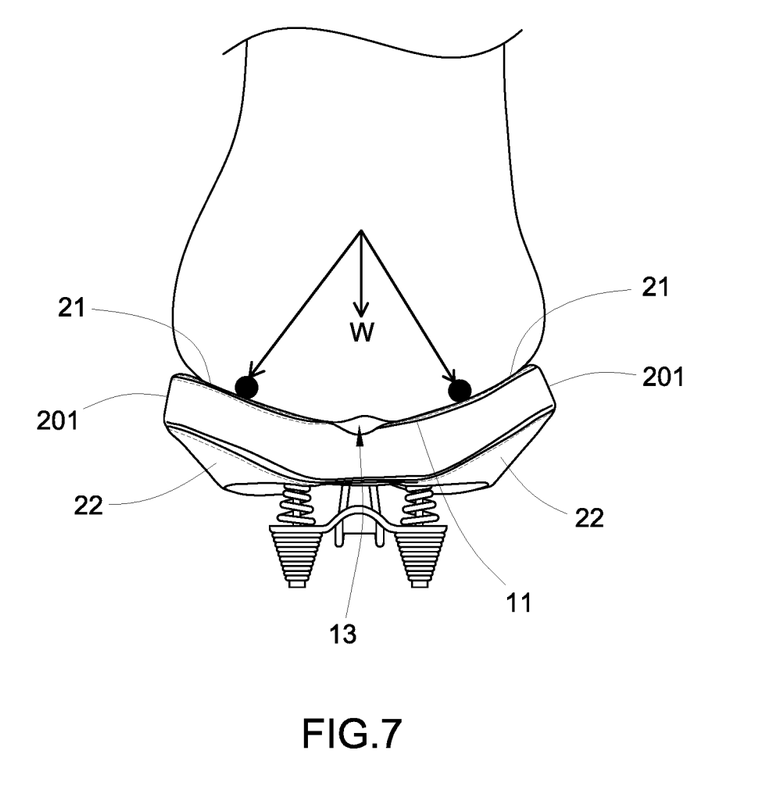
FIG. 7 is a rear view of the seating device according to the above preferred embodiment of the present invention, illustrating two side buttocks of the user being supported by the wing supports of the seating device respectively.

As shown in FIGS. 4 and 5A, the top buttock supporting surface 21 of each of the wing supports 20 has a curvature upwardly curving to a side edge 211 of the top supporting surface 21 and upwardly curving to a rear edge 212 of the top buttock supporting surface 21. Preferably, the curvature of the top buttock supporting surface 21 of each of the wing supports 20 is downwardly curing toward a front edge 213 of the top buttock supporting surface 21. Therefore, when the user sits on the seating device of the present invention, outer portions of the buttocks of the user are supported by the upward curing side edges 211 of the top supporting surfaces 21, rear portions of the buttocks of the user are supported by the upward curing rear edges 212 of the top supporting surfaces 21, front portions of the buttocks of the user are rested on the downward curing front edges 213 of the top supporting surfaces 21 to allow leg movements of the user. In other words, the top supporting surface 21 of each of the wing supports 20 forms a basin configuration to provide a full contact surface to support the buttocks of the user as shown in FIG. 7, while the user is able to freely move his or her legs between a front portion of the seat body 10 as shown in FIG. 9. It is worth mentioning that a distance between the side tips 201 of the wing supports 20 is configured not smaller than a hip size of the user. Furthermore, since the rear portions of the buttocks of the user are supported by the upward curing rear edges 212 of the top supporting surfaces 21 when sitting on the seating device of the present invention, the user does not have to lean forward his or her body for body balancing manner, such that the user is able to sit up straight to prevent the lower back strain and tailbone pain as shown in FIG. 8.

It is worth mentioning that when the user sits on the seating device of the present invention, the weight W of the user as the downward force will break down into two outward forces at the buttocks of the user to the wing supports 20, as shown in FIG. 7, wherein the outward forces applied at the points of the wing supports 20 are defined as two support points respectively. The support points are also known as two stress points P where stress will create at the buttock of the user. Accordingly, the stress points P at the buttocks of the user are located at and supported by the top buttock supporting surfaces 21 of the wing supports 20, as shown in FIG. 7. Therefore, due to the unbalanced sitting posture, such as the user sits slumped to one side with spine bent, keep the knees, ankles or arm crossed, or any body movement, the stress point at the buttock of the user will be well supported by one of the top buttock supporting surfaces 21 to provide pain relief in legs, butt, and tailbone of the user.

Accordingly, when the user sits on the seating device of the present invention, the downward force, i.e. the weight of the user, will apply on the seat body 10 and the wing supports 20 at the same time. Accordingly, the wing supports 20 are flatten and downwardly pressed by the weight of the user. If the downward pressure is great enough, especially when the weight of the user is applied on one of the wing supports 20, the wing support 20 may be further pressed downwardly to deform the shape of the wing support 20 so as to sag down the wing support 20. As a result, the wing supports 20 will loss the supportability. According to the preferred embodiment, the bottom retention surfaces 22 are configured to reinforce the top buttock supporting surfaces 21. The bottom retention surface 22 is inclinedly and upwardly extended to the side tip 201 of the wing support 20 to support the top buttock supporting surface 21, such that the wing support 20 is reinforced by the bottom retention surface 22 in a tilt manner.

It is worth mentioning that, as shown in FIG. 5B, each of the wing supports 20 further has a bottom extension surface 221 extended from the bottom surface 12 of the seat body 10 to the bottom retention surface 22. In other words, a bottom side 220 of the wing support 20A is constructed to have the bottom extension surface 221 and the bottom retention surface 22, wherein the size of the mounting plate 31 of the mounting base 30 can be enlarged to not only couple at the bottom surface 12 of the seat body 10 but also the bottom extension surfaces 221 of the wing supports 20 so as to enhance the supportability and rigidness of the mounting base 30 to the seating device of the present invention.

As shown in FIG. 5A, the bottom retention surface 22 of each of the wing supports 20 is a convex surface curving toward a front side and a rear side of the wing support 20. In other words, the peak of the convex bottom retention surface 22 is defined at the side tip 201 of the wing support 20. The convex bottom retention surface 22 is further configured to reinforce the wing support 20 in a tilt up manner so as to prevent the wing support 20 being deformed when the support the top buttock supporting surface 21 is pressed.

Furthermore, a thickness of each of the wing supports 20 is gradually reduced to the side tip 201 of the wing support 20 in response to the side tip 201 thereof. The thickness of the wing support 20 is defined as a distance between the top buttock supporting surface 21 and the bottom retention surface 22 of the wing support 20. It is worth mentioning that due to the three-dimensional configuration of the wing support 20, the wing support 20 will have different thicknesses at different portion. As the upward curing side edge 211 of the top supporting surface 21, the thickness of the wing support 20 at the front tip thereof is smaller than the thickness of the wing support 20 at the rear tip thereof.

As shown in FIG. 5A, the side tip 201 of each of the wing supports 20 has a surface configuration, wherein the side tip 201 is inclinedly extended from the bottom retention surface 22 to the top buttock supporting surface 21. Particularly, the side tip 201 is upwardly and inwardly extended from the bottom retention surface 22 to the top buttock supporting surface 21. The side tip 201 of each of the wing supports 20 is a convex surface curving toward the front side and the rear side of the wing support 20. Therefore, an angle between the bottom retention surface 22 at the peak line and the side tip 201 at the peak line is an acute angle to support the wing support 20. It is worth mentioning that the side tip 201 of each of the wing supports 20 is curving rearwardly to the rear tip of the wing support 20, and is curving frontwardly to the front tip of the wing support 20.

Figure 6:
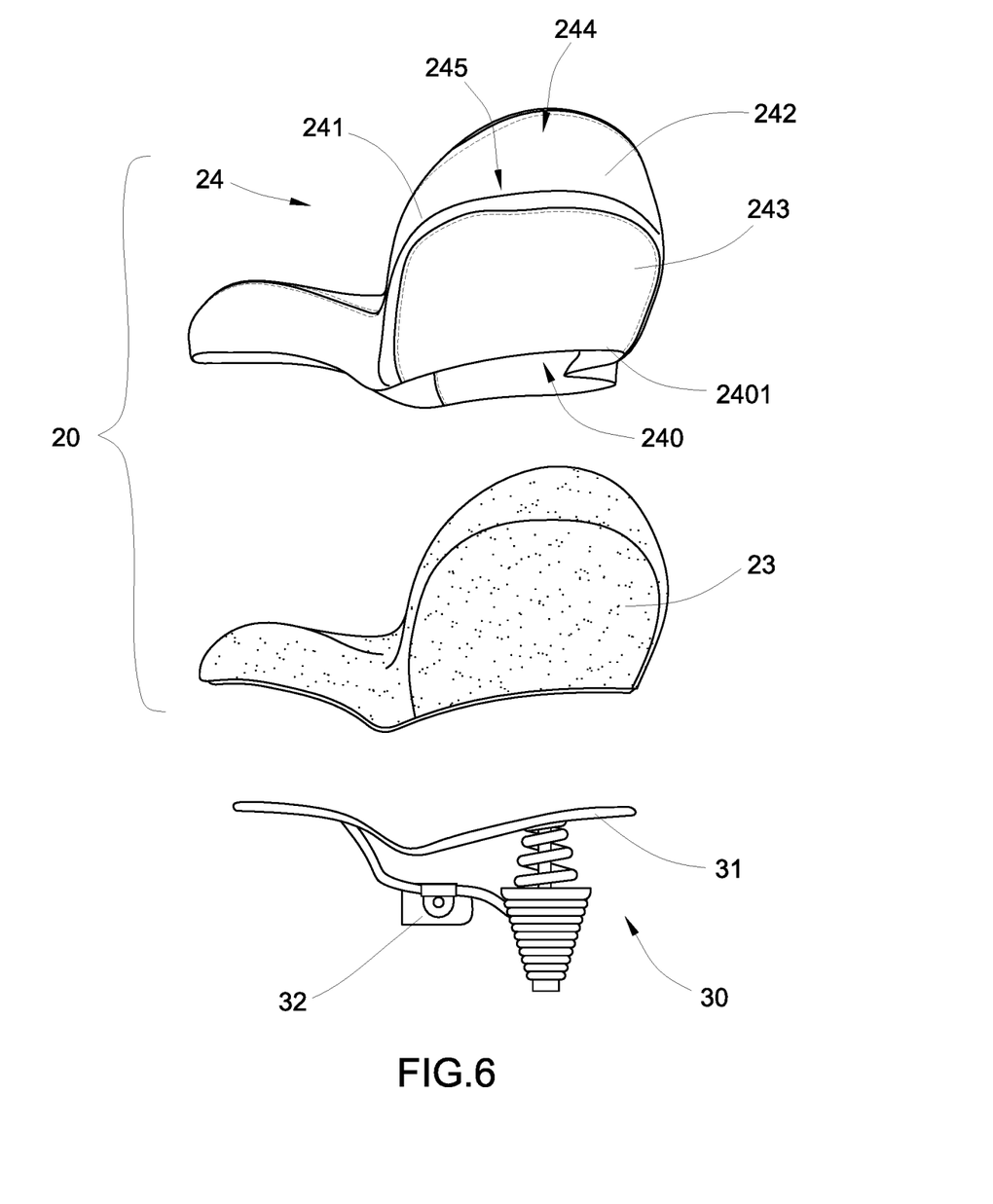
FIG. 6 is an exploded view of the seating device according to the above preferred embodiment of the present invention.

As shown in FIG. 6, each of the wing supports 20 comprises a core member 23 which is made of foam material and an outer skin 24 enclosing and compressing the core member 23 therein so as to retain a contour of the core member 23. Accordingly, since the wing supports 20 are integrally extended from the seat body 10 to form a one piece seating member, the core members 23 of the wing supports 20 are integrally formed with a core member of the seat body 11 to form a one piece seating core member. Likewise, the outer skins 24 of the wing supports 20 are integrally formed with a skin of the seat body 11 to form a one piece seating skin.

According to the preferred embodiment, the core member 23 is made of high density memory foam to well support the weight W of the user. The core member 23 is wrapped within the outer skin 24 to retain the contour of the core member 23. As shown in FIG. 6, the outer skin 24 is constructed to have a top skin layer 241, a side skin layer 242, and a bottom skin layer 243. Accordingly, the top buttock supporting surface 21 of the wing support 20 is overlaid by the top skin layer 241. The bottom retention surface 22 of the wing support 20 is overlaid by the bottom skin layer 243. The side tip, front tip and rear tip of the wing support 20 are overlaid by the side skin layer 242. An edge of the top skin layer 241 is stitched with an upper edge of the side skin layer 242 to define a first stitching line 244. A lower edge of the side skin layer 242 is stitched with an edge of the bottom skin layer 243 to define a second stitching line 245. The top skin layer 241, the side skin layer 242, and the bottom skin layer 243 are made of stretchable material to provide a predetermined stretch ability when the core member 23 is deformed due to the weight of the user. Furthermore, the stretch ability of the outer skin 24 ensures the core member 23 being enclosed and compressed in the outer skin 24 so as to retain the contour of the core member 23 and to prevent the over-deformation of the core member 23.

It is worth mentioning that the top skin layer 241, the side skin layer 242, and the bottom skin layer 243 can be made of different material. The top skin layer 241 should be made of non-slipping material to prevent any slipping when the user sits and contacts with the top skin layer 241. The side skin layer 242 can be made of durable material to further provide an additional support of the top buttock supporting surface 21. The bottom skin layer 243 can be made of breathable material. For example, the top skin layer 241 and the side skin layer 242 can be made of synthetic leather, and the bottom skin layer 243 can be made of nylon or synthetic fibers.

In order to wrap the core member 23 in the outer skin 24, the top skin layer 241, the side skin layer 242, and the bottom skin layer 243 are stitched with each other to form a pocket to match with the contour of the core member 23. Accordingly, the pocket of the outer skin 24 has a bottom opening 240. Then, by slightly compressing and deforming the core member 23, the core member 23 can be received in the pocket of the outer skin 24 through the bottom opening. By aligning the first stitching line 244 with an edge between a top surface and a side surface of the core member 23, the core member 23 is alignedly wrapped within the outer skin 24 to define the top buttock supporting surface 21 and the side tip 201 of the wing support 20. Likewise, by aligning the second stitching line 245 with an edge between the side surface and a bottom surface of the core member 23, the core member 23 is alignedly wrapped within the outer skin 24 to define the side tip 201 and the bottom retention surface 22 of the wing support 20. In other words, the first stitching line 244 is defined along an edge between the top buttock supporting surface 21 and the side tip 201 of the wing support 20. The second stitching line 245 is defined along an edge between the side tip 201 and the bottom retention surface 22 of the wing support 20. Once the core member 23 is wrapped in the outer skin 24, an opening edge 2401 of the bottom opening 240 is located at the bottom surface 12 of the seat body 10, such that when the mounting plate 31 is coupled at the bottom surface 12 of the seat body 10, the opening edge 2401 of the pocket of the outer skin 24 is enclosed and sealed by the mounting plate 31.

Figure 10:
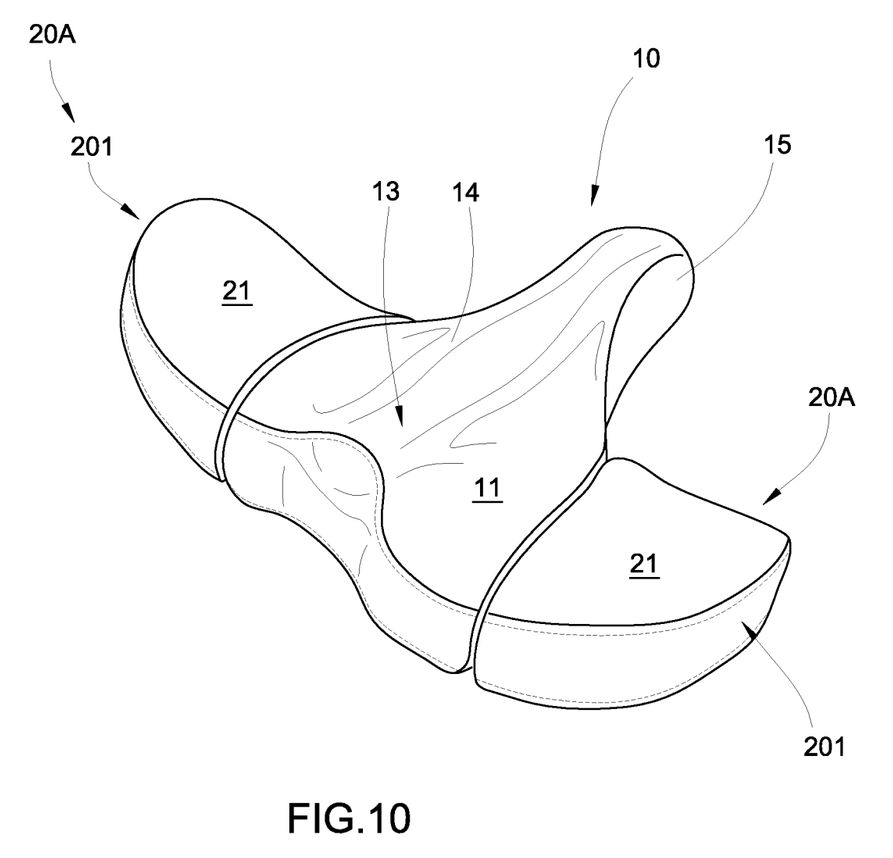
FIG. 10 illustrates an alternative mode of the wing support of the seating device according to the above preferred embodiment of the present invention.
Figure 11:
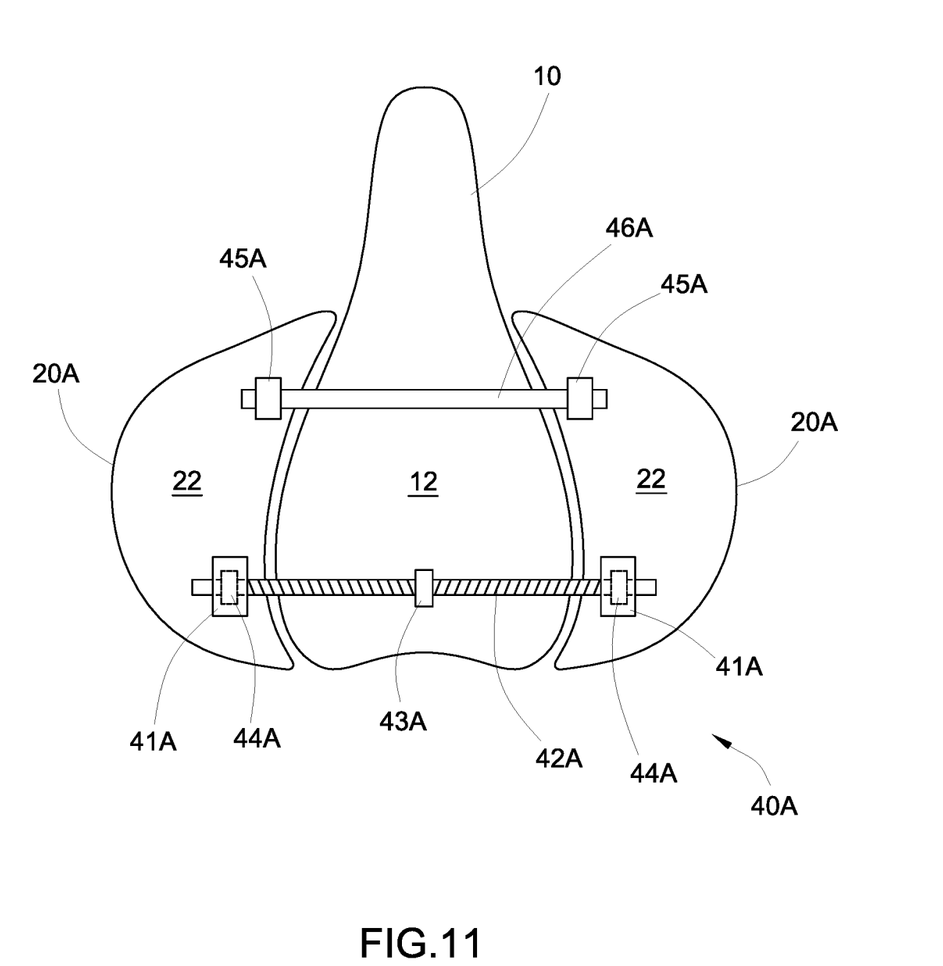
FIG. 11 is a bottom view of the alternative mode of the wing support of the seating device according to the above preferred embodiment of the present invention.

FIGS. 10 and 11 illustrate an alternative mode of the wing supports 20A, wherein the wings supports 20 are movably and sidewardly extended from two sides of the seat portion 14 of the seat body 15 respectively. Each of the wings supports 20A have the same structural configuration as in the above mentioned wing support 20 except the wing supports 20A and the seat body 10 are separated components according to the alternative mode of the present invention.

Accordingly, each of the wing support 20A is sidewardly moved from the seat body 10 in an controllably adjusting manner to selectively adjust a distance between the wing support 20A and the seat body 10. Particularly, the wings supports 20A are synchronizedly moved with respect to the seat body 10, such that the wing supports 20A are concurrently moved toward the seat body 10 to reduce the distance between the side tips 201 of the wing supports 20A. Likewise, the wing supports 20A are concurrently moved away from the seat body 10 to increase the distance between the side tips 201 of the wing supports 20A. Therefore, the overall width of the seating device of the present invention is adjustable by adjusting the distance between the side tips 201 of the wing supports 20A to fit different users having different hip sizes.

As shown in FIG. 10, an adjustable channel is defined between each of the wing supports 20A and the seat body 10, wherein a width of the adjustable channel is reduced when the wing support 20A is moved toward the seat body 10 while the width of the adjustable channel is increased when the wing support 20A is moved away from the seat body 10.

As shown in FIG. 11, the wing supports 20A are moved in a synchronized manner via an adjustable assembly 40A, wherein the adjustable assembly 40A comprises two affixing members 41A affixed at two bottom retention surfaces 22 of the wing supports 20A respectively, a threaded shaft 42A rotatably extended through the affixing members 41A, and an adjusting wheel 43A rotatably coupled at the threaded shaft 42A, wherein the threaded shaft 42A has two opposing extending thread portions extending toward two ends thereof. When the adjusting wheel 43A is rotated at one direction, the threaded shaft 42A is driven to rotate to concurrently push the affixing members 41A away from each other so as to increase the distance between the wing supports 20A. When the adjusting wheel 43A is rotated at an opposite direction, the threaded shaft 42A is driven to rotate to concurrently pull the affixing members 41A toward each other so as to reduce the distance between the wing supports 20A. The adjustable assembly 40A further comprises two threaded sleeves 44A formed at the affixing members 41A to rotatably engage with the opposing extending thread portions of the threaded shaft 42A respectively. In other words, the threaded shaft 42A is rotatably extended through the threaded sleeves 44A, wherein the adjusting wheel 43A is located between the threaded sleeves 44A as shown in FIG. 11.

The adjustable assembly 40A further comprises two guiding members 45A affixed at two bottom retention surfaces 22 of the wing supports 20A respectively, and a guiding shaft 46A slidably extended through the guiding members 45A. It is worth mentioning that the threaded shaft 42A and the guiding shaft 46A are spaced apart from each other. Preferably, the threaded shaft 42A is extended at rear portions of the wing supports 20A while the guiding shaft 46A is extended at front portions of the wing supports 20A to maximize a distance between the threaded shaft 42A and the guiding shaft 46A. Therefore, when the wing supports 20A are sidewardly moved via the threaded shaft 42A, the wing supports 20A are guided to move in a stable manner via the guiding shaft 46A.

In order to manufacture the seating device, the present invention further provides a manufacturing method comprising the following steps.

(1) Manufacture the outer skin 24. Accordingly, the outer skin 24 is made by the steps of (1.1) cutting the top skin layer 241, the side skin layer 242, and the bottom skin layer 243 into predetermined shapes, (1.2) stitching the edge of the top skin layer 241 with the upper edge of the side skin layer 242, and (1.3) stitching the lower edge of the side skin layer 242 with the edge of the bottom skin layer 243. It is worth mentioning that when the wing supports 20 are integrated with the seat body 10, the top skin layer 241, the side skin layer 242, and the bottom skin layer 243 of the wing support 20 are integrated with the top skin layer, the side skin layer, and the bottom skin layer of the seat body 10 to form a top layer, a side layer and a bottom layer, as shown in FIG. 6. Therefore, the outer skin 24 also forms a pocket of the seat body 10, wherein the outer skin 24 is constructed to have the top layer, the side layer, and the bottom layer as such that the top skin layer 241, the side skin layer 242, and the bottom skin layer 243 to enclose the seat body 10 and the wing supports 20 together.

(2) Manufacture the core member 23. Accordingly, a raw material is disposed in a mold and is foamed to form the core member 23 via a foaming process. In other words, the core member 23 is shaped and sized according to the mold. In one embodiment, the core member 23 are core elements of the wing supports 20 and a core element of the seat body 10 integrated together.

(3) Wrap the core member 23 in the outer skin 24. Accordingly, the outer skin 24 is folded inside-out to receive core member 23 therein. Preferably, an adhering agent is initially applied on the top surface, side surface and bottom surface of the core member 23. The top layer of the outer skin 24 is adhered on the top surface of the core member 23 to initially align and retain the outer skin 24 on the core member 23. Then, by slightly compressing the core member 23 and unfolding the side layer and the bottom layer of the outer skin 24 to overlap on the side surface and the bottom layer of the core member 23, the core member 23 is wrapped within the outer skin 24.

(4) Couple the mounting plate 31 at the bottom surface 12 of the seat body 10. It is worth mentioning that since the opening edge 2401 of the bottom opening 240 of the outer skin 24 is folded at the bottom surface 12 of the seat body 10, the opening edge 2401 of the outer skin 24 is mounted and sealed by the mounting plate 31. In other words, the opening edge 2401 of the outer skin 24 is mounted and sealed between the bottom surface 12 of the seat body 10 and the mounting plate 31.

(5) Selectively couple the mounting structure 32 to the mounting plate 31 to form the seating device. By selecting a desired mounting structure 32 to mount at the mounting plate 31, the seating device can form as the stool seat or bicycle saddle as an example.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A seating device, comprising:
a seat body having a top seat supporting surface and a bottom surface;
a mounting base coupled at said bottom surface of said seat body; and
two wing supports sidewardly extended from two sides of said seat body respectively, wherein each of said wing supports has a top buttock supporting surface upwardly and sidewardly extended from said top seat supporting surface of said seat body to a side tip of said wing support, and a bottom retention surface inclinedly and upwardly extended to said side tip of said wing support for reinforcing said wing support in a tilt up manner so as to prevent said wing support being sagged down when said wing support is pressured, wherein each of said two wing supports has a bottom extension surface extended from said bottom surface of said seat body to said bottom retention surface to form a bottom side of said wing support, wherein a thickness of each of said wing supports, which is a distance between said top buttock supporting surface and said bottom retention surface, is gradually reduced toward said side tip of said wing support.

2. The seating device, as recited in claim 1, wherein said top buttock supporting surface of each of said wing supports has a curvature upwardly curving to a side edge of said top supporting surface and upwardly curving to a rear edge of said top buttock supporting surface.

3. The seating device, as recited in claim 2, wherein said bottom retention surface is a convex surface curving toward a front side and a rear side of said wing support.

4. The seating device, as recited in claim 3, wherein said side tip of each of said wing supports has a surface configuration and is upwardly and inwardly extended from said bottom retention surface to said top buttock supporting surface.

5. A seating device, comprising:
a seat body having a top seat supporting surface and a bottom surface;
a mounting base coupled at said bottom surface of said seat body; and
two wing supports sidewardly extended from two sides of said seat body respectively, wherein each of said wing supports has a top buttock supporting surface upwardly and sidewardly extended from said top seat supporting surface of said seat body to a side tip of said wing support, and a bottom retention surface inclinedly and upwardly extended to said side tip of said wing support for reinforcing said wing support in a tilt up manner so as to prevent said wing support being sagged down when said wing support is pressured, wherein each of said two wing supports has a bottom extension surface extended from said bottom surface of said seat body to said bottom retention surface to form a bottom side of said wing support, wherein a thickness of said wing support at a front tip thereof is smaller than a thickness of said wing support at a rear tip thereof.

6. The seating device, as recited in claim 4, wherein a thickness of said wing support at a front tip thereof is smaller than a thickness of said wing support at a rear tip thereof.

7. A seating device, comprising:
a seat body having a top seat supporting surface and a bottom surface;
a mounting base coupled at said bottom surface of said seat body;
two wing supports sidewardly extended from two sides of said seat body respectively, wherein each of said wing supports has a top buttock supporting surface upwardly and sidewardly extended from said top seat supporting surface of said seat body to a side tip of said wing support, and a bottom retention surface inclinedly and upwardly extended to said side tip of said wing support; and
an outer skin comprising a top skin layer overlaying said two top buttock supporting surfaces of said two wing supports, a bottom skin layer overlaying said two bottom retention surfaces of said two wing supports, and a side skin layer overlaying said two side tips of said two wing supports, wherein an edge of said top skin layer is stitched with an upper edge of said side skin layer to define a first stitching line at an edge between said top buttock supporting surface and said side tip and a lower edge of said side skin layer is stitched with an edge of said bottom skin layer to define a second stitching line at an edge between said side tip and said bottom retention surface.

8. The seating device as recited in claim 7, wherein each of said wing supports comprises a core member which is made of foam material and said outer skin is configured to enclose and compress said core member therein so as to retain a contour of said core member.

9. The seating device, as recited in claim 7, wherein said top buttock supporting surface of each of said wing supports has a curvature upwardly curving to a side edge of said top supporting surface and upwardly curving to a rear edge of said top buttock supporting surface, wherein a thickness of each of said wing supports, which is a distance between said top buttock supporting surface and said bottom retention surface, is gradually reduced toward said side tip of said wing support, wherein said bottom retention surface is a convex surface curving toward a front side and a rear side of said wing support.

* * * * *